US008516913B2

(12) United States Patent
Jones

(10) Patent No.: US 8,516,913 B2
(45) Date of Patent: Aug. 27, 2013

(54) ACTUATOR

(75) Inventor: Timothy John Jones, Wakefield (GB)

(73) Assignee: Timothy John Jones, Wakefield (GB)

( * ) Notice: Subject to any disclaimer, the term of this patent is extended or adjusted under 35 U.S.C. 154(b) by 711 days.

(21) Appl. No.: 12/760,228

(22) Filed: Apr. 14, 2010

(65) Prior Publication Data

US 2010/0210383 A1 Aug. 19, 2010

Related U.S. Application Data

(62) Division of application No. 11/572,371, filed as application No. PCT/GB2005/002834 on Jul. 18, 2005, now abandoned.

(51) Int. Cl.
*F16H 27/02* (2006.01)

(52) U.S. Cl.
USPC .................. 74/89.22; 74/89.2; 74/63; 474/84

(58) Field of Classification Search
USPC ...................... 74/89.2, 89.22, 63; 474/62, 84
See application file for complete search history.

(56) References Cited

U.S. PATENT DOCUMENTS

| | | |
|---|---|---|
| 324,509 A | 8/1885 | Winans |
| 331,487 A | 12/1885 | Foushee |
| 396,430 A | 1/1889 | Reichel |
| 2,685,377 A | 8/1954 | Auger |
| 2,705,427 A | 4/1955 | Schipper |
| 2,859,629 A | 11/1958 | Parker et al. |
| 2,884,788 A | 5/1959 | Clark |
| 3,044,312 A | 7/1962 | Hall et al. |
| 3,231,260 A | 1/1966 | Shirley |
| 3,273,408 A | 9/1966 | Nagel et al. |
| 3,810,689 A | 5/1974 | Moodie |
| 3,828,615 A | 8/1974 | O'Connor |
| 3,850,043 A | 11/1974 | Tarbox |

(Continued)

FOREIGN PATENT DOCUMENTS

| | | |
|---|---|---|
| EP | 0161431 A | 11/1985 |
| GB | 1479281 | 7/1977 |

(Continued)

*Primary Examiner* — David M Fenstermacher
(74) *Attorney, Agent, or Firm* — Tristan Z. Fuierer; Moore & Van Allen, PLLC

(57) ABSTRACT

This invention relates to an actuator and has particular reference to linear and rotary actuators, particularly those for use in the control of robotic arms. The invention provides a relatively low cost means of achieving substantially backlashfree rotary and/or linear motion. There is provided an actuator (10) comprising: a first drive pulley (28); a second drive pulley (29), the first drive pulley and the second drive pulley being interconnected to rotate together; a first driven pulley (52; 70); a second driven pulley (53; 72); an endless drive belt (40) engaging the first and second drive pulleys and the first and second driven pulleys; a motor (19) connected to drive the first and second drive pulleys to rotate and drive the endless drive belt; a driven member (50; 88; 71, 73) carrying at least one of the driven pulleys; the first and second drive pulleys being arranged so that upon rotation thereof the circumferential speed of the first drive pulley is different from the circumferential speed of the second drive pulley, the endless drive belt being looped around the drive pulleys and the driven pulleys so that the difference between the circumferential speed of the first drive pulley and the circumferential speed of the second drive pulley causes movement of the driven member.

8 Claims, 6 Drawing Sheets

(56) References Cited

U.S. PATENT DOCUMENTS

Figures 1, 2:
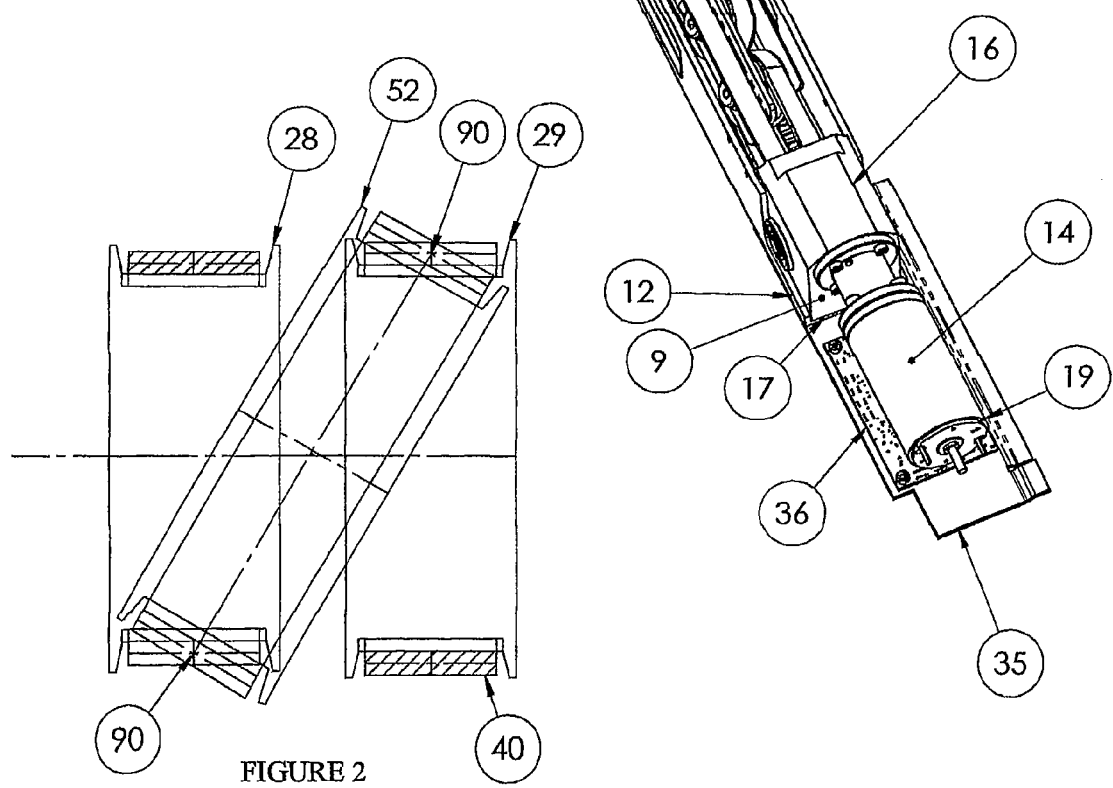

| | | | |
|---|---|---|---|
| 3,872,960 A | | 3/1975 | Gabor |
| 3,910,130 A | | 10/1975 | Traughber, Jr. |
| 4,053,043 A | * | 10/1977 | Deetz ................. 400/144.2 |
| 4,116,568 A | | 9/1978 | Suzuki et al. |
| 4,291,630 A | | 9/1981 | Fort |
| 4,327,596 A | | 5/1982 | Simon |
| 4,403,877 A | * | 9/1983 | Jones et al. ................. 400/335 |
| 4,470,363 A | | 9/1984 | Kalayjian |
| 4,485,594 A | | 12/1984 | Guertin et al. |
| 4,507,044 A | | 3/1985 | Hutchins et al. |
| 4,524,520 A | * | 6/1985 | Levy ................. 33/1 M |
| 4,566,346 A | * | 1/1986 | Petiteau ................. 74/89.22 |
| 4,768,443 A | | 9/1988 | Bruggisser et al. |
| 4,872,799 A | * | 10/1989 | Fisher, Jr. ................. 414/180 |
| 5,063,676 A | * | 11/1991 | Gerber ................. 33/1 M |
| 5,134,779 A | | 8/1992 | Sprenger et al. |
| 5,276,970 A | * | 1/1994 | Wilcox et al. ................. 33/18.1 |
| 5,331,862 A | | 7/1994 | Baginski et al. |
| 5,539,987 A | * | 7/1996 | Zennyoji ................. 33/1 M |
| 5,568,189 A | * | 10/1996 | Kneller ................. 348/144 |
| 5,611,248 A | * | 3/1997 | Peltier ................. 74/490.09 |
| 5,830,094 A | * | 11/1998 | DeNijs ................. 474/73 |
| 6,134,978 A | | 10/2000 | Lin |
| 6,216,797 B1 | * | 4/2001 | Draney et al. ................. 173/147 |
| 6,503,163 B1 | * | 1/2003 | Van Sant et al. ................. 474/101 |
| 6,525,503 B2 | * | 2/2003 | Fang ................. 318/637 |
| 6,626,630 B1 | * | 9/2003 | Lomerson et al. ................. 414/749.1 |
| 7,124,657 B2 | * | 10/2006 | Nagai et al. ................. 74/89.2 |
| 7,331,967 B2 | * | 2/2008 | Lee et al. ................. 606/130 |
| 7,997,158 B2 | * | 8/2011 | Grossart ................. 74/89.2 |
| 8,042,425 B2 | * | 10/2011 | Dujardin ................. 74/490.09 |

FOREIGN PATENT DOCUMENTS

| | | |
|---|---|---|
| JP | 02199345 A | 10/1990 |
| JP | 2002199345 A | 7/2002 |
| WO | 0161431 A1 | 8/2001 |

* cited by examiner

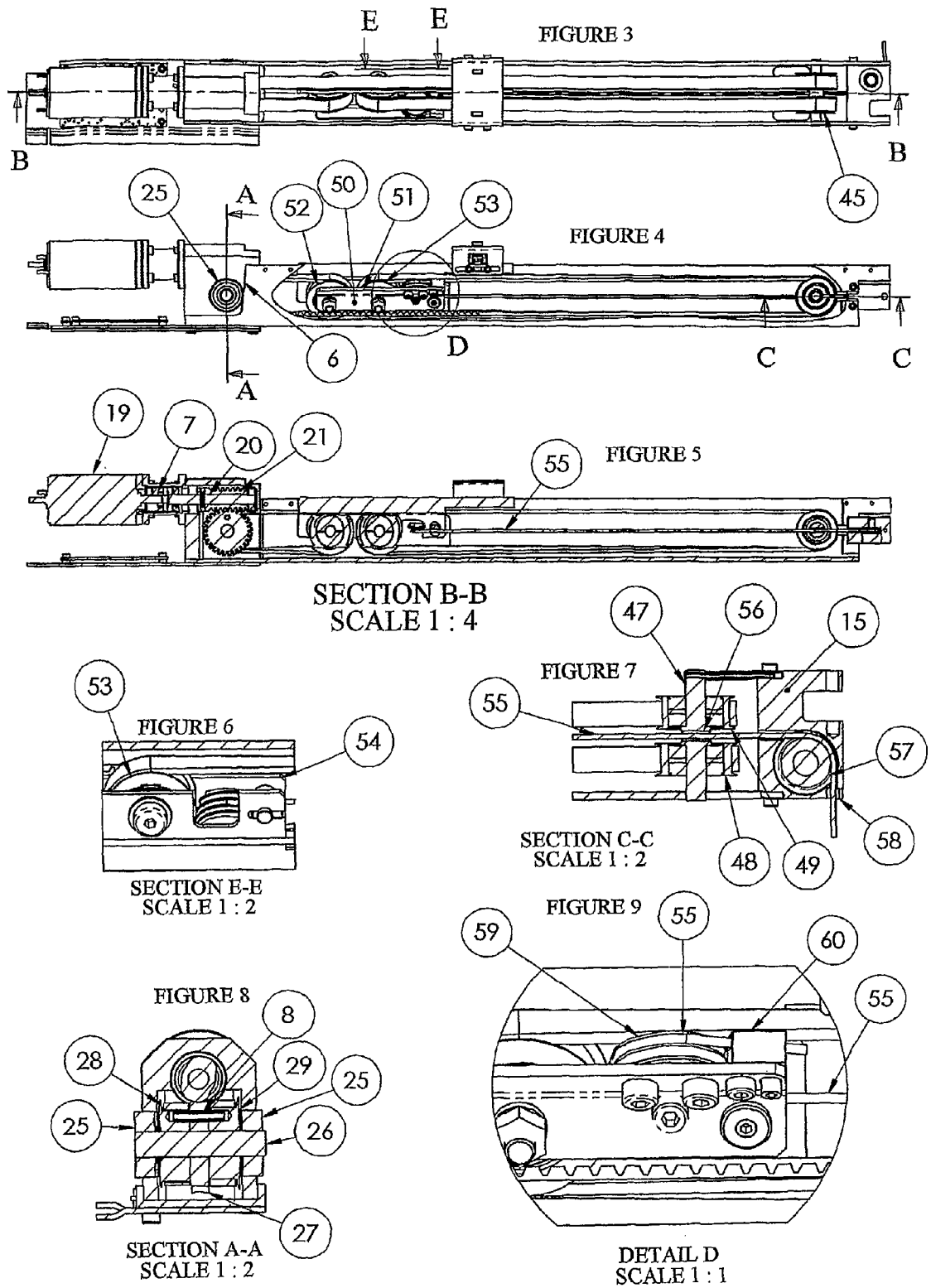

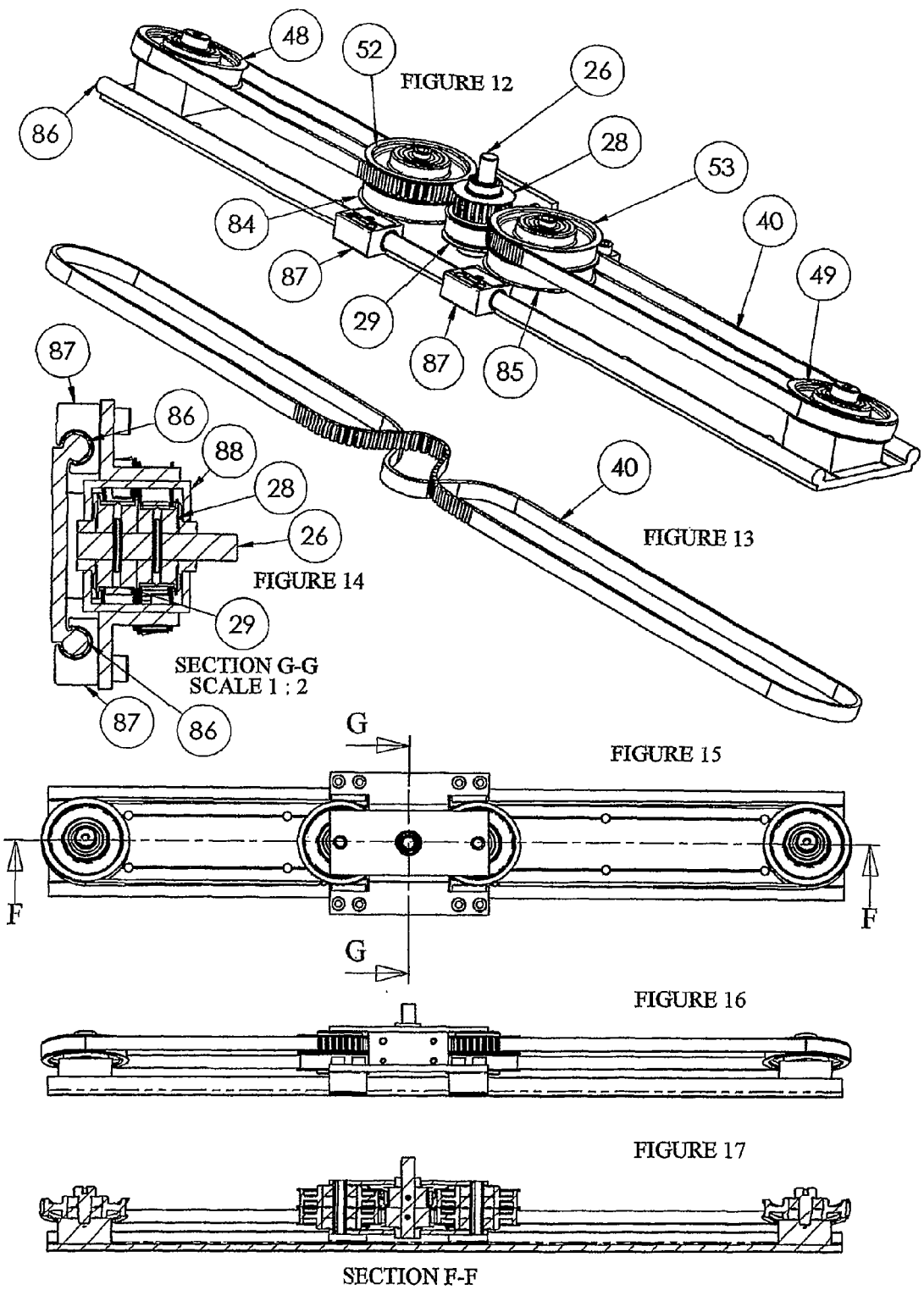

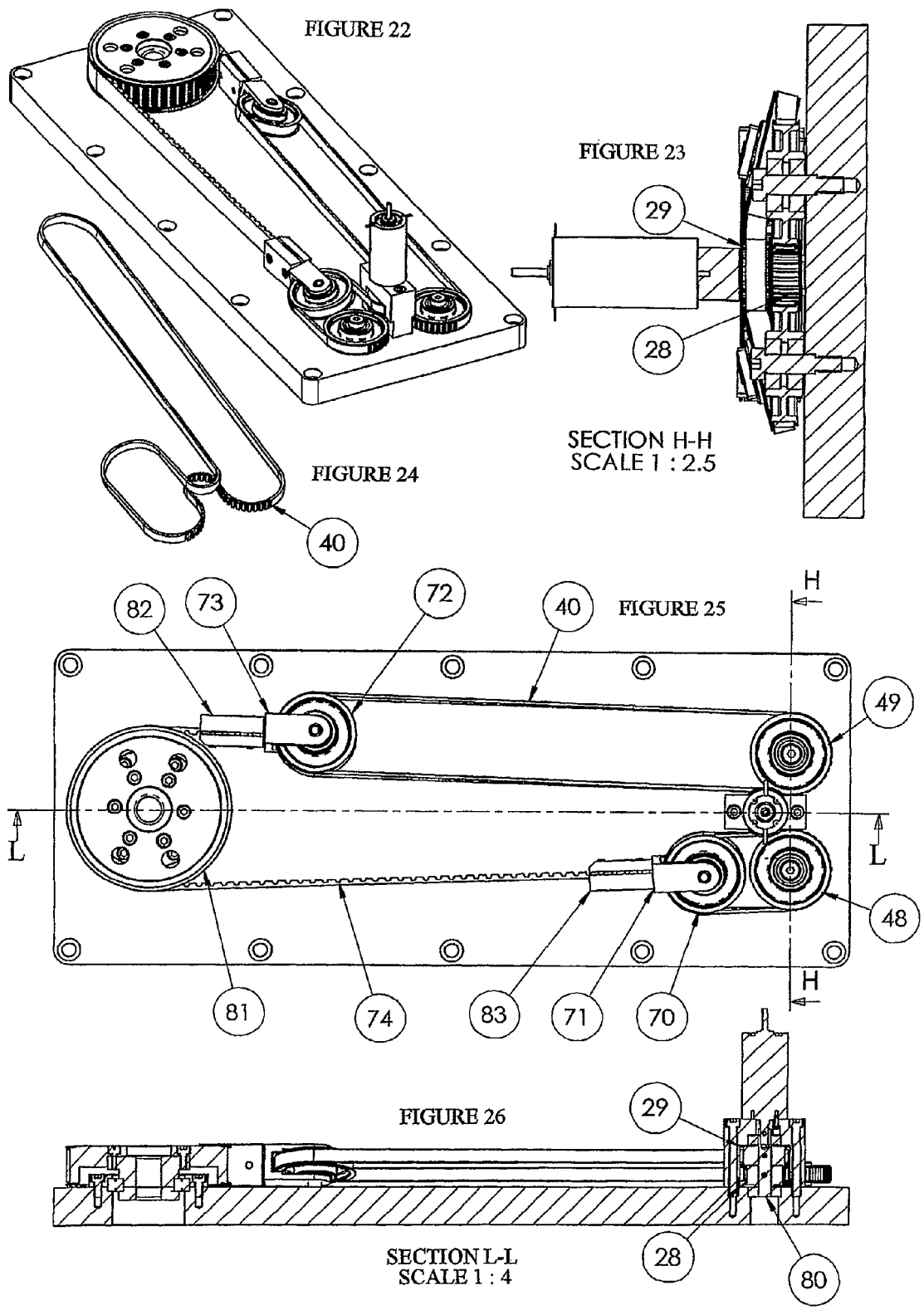

ACTUATOR

CROSS-REFERENCE TO RELATED APPLICATIONS

This application is filed under the provisions of 35 U.S.C. §120 and is a divisional application claiming priority to U.S. patent application Ser. No. 11/572,371 filed on Jan. 19, 2007, which claims the priority of International Patent Application No. PCT/GB2005/002834 filed on Jul. 18, 2005 in the name of Timothy John Jones and entitled "Actuator," which in turn claims priority of Great Britain Application No. GB 0416186.5 filed on Jul. 20, 2004, all of which are incorporated by reference herein in their entirety.

This invention relates to an actuator and has particular reference to linear and rotary actuators, particularly those for use in the control of robotic arms.

With the increasing use of robotic arms in manufacturing processes and for general inspection and maintenance functions, there has been an increase in the number of control functions associated with each arm and it is not uncommon for a sophisticated, multifunctional arm to require upwards of thirty separate control elements. Each of these elements needs to be individually controlled by a separate actuator.

It thus becomes necessary to concentrate a large number of control functions in a relatively small space. Many robotic arms are controlled or manipulated by control wires. As the arms become more sophisticated and smaller in size and hence able to undertake more intricate operations, those same intricate operations require more control functions and the demand, increasingly, is for more control functions in ever reducing space.

Traditionally, actuators for the control wires of robotic arms have been of the capstan type. These comprise a motor driving a windup capstan around which the control wire is wrapped. Operation of the motor drives the capstan and causes or allows corresponding movement of the wire. These capstan drives are relatively bulky, and furthermore tend to produce stretching and slippage of the wire about the capstan thus rendering precision of control more difficult. In order to overcome this problem, it is frequently the case that the control mechanism and motor drives for each control are spaced from the base of datum of the robotic arm thus resulting in a relatively large and bulky control assembly for the arm.

In an attempt to overcome this, linear actuators have been produced having a movable carriage to which the control wire is attached and the whole is mounted upon a screw or worm so the rotation of the screw or worm results in movement of the carriage. A disadvantage of this arrangement is the relative weight of the assembly and the inevitable backlash in the worm or screw arrangement. Furthermore, such arrangements tend to have relatively high frictional forces and the mechanical advantage achievable is effectively that of an inclined plane defined by the pitch of the screw.

An alternative is to use a ball screw arrangement, which could minimise backlash. However, such an arrangement is expensive and only suitable for short stroke arrangements, as the weight of the screw increases with length, and the inertia of long-stroke ball screws is not generally acceptable. In addition, connecting a control wire to a ball screw arrangement is typically difficult in practice.

There is, therefore, a need for a linear actuator capable of providing high loading to a control wire with low frictional loss and yet of a compact construction so that a number may be clustered in a relatively small space for control of a robotic arm or like device.

Many actuators used in industry for general positioning (as compared to those for pulling wires) are electrically driven and can be subdivided into several speed categories and several precision categories. The speed categories are slow (say 0-25 mm per second), medium (say 25-500 mm per second) and high (>500 mm per second). The precision categories can be defined as zero precision (absolute positioning not required and backlash unimportant), low precision (positioning required but low accuracy and some backlash acceptable say 0.25-3 mm) and high precision (where accurate positioning and zero/low backlash is required—say 0.001-0.25 mm). Such actuators are often powered by rotary electric motors; although direct drive linear actuators are available, they are costly to build and control. Where the linear actuator is powered by a rotary electric motor, several design options are available to produce the linear motion, these include belt drives, lead screws, ball screws, and rack and pinion mechanisms. In most cases for low and medium speed applications, a gearbox will be required between the motor and the linear motion converter in order to match the motor speed (typically 3000-6000 rpm) to the required pulley/pinion/ball-screw speed. The gearbox adds considerably to the cost, particularly if high precision is required as in a zero/low backlash environment as the gearbox must be at least as accurate as the motor and the linear motion converter.

The present invention relates to an actuator having a drive belt to generate motion using a harmonic principle, which reduces or eliminates the need for a gearbox between the motor and the drive pulley for low and medium speed applications. As an additional benefit, such a drive is substantially backlash free thereby allowing a high precision drive at relatively low cost.

According to the invention, there is provided an actuator comprising:

a first drive pulley;
a second drive pulley, the first drive pulley and the second drive pulley being interconnected to rotate together;
a first driven pulley;
a second driven pulley;
an endless drive belt engaging the first and second drive pulleys and the first and second driven pulleys;
a motor connected to drive the first and second drive pulleys to rotate and drive the endless drive belt;
a driven member carrying at least one of the driven pulleys;
the first and second drive pulleys being arranged so that upon rotation thereof the circumferential speed of the first drive pulley is different from the circumferential speed of the second drive pulley, the endless drive belt being looped around the drive pulleys and the driven pulleys so that the difference between the circumferential speed of the first drive pulley and the circumferential speed of the second drive pulley causes movement of the driven member.

In the following specific description, the embodiments described utilise a drive belt. The term "drive belt" is also used in the claims and preamble, but unless otherwise indicated the term "belt" should be understood to encompass any suitable continuous or endless drive member such as a chain, cable, wire or the like. Similarly, the term "pulley" is used in the following specific description throughout, as it is common to use pulleys with a drive belt, but the term "pulley" should be understood to encompass gears and sprockets as well as toothed or untoothed wheels and rollers, or the like.

The circumferential speeds can differ because of the drive pulleys having different circumferential lengths, having different rates of rotation, or both.

The drive belt may be toothed, and in such embodiments at least the drive pulleys are preferably toothed to engage with the belt.

The actuator can be a rotary actuator, preferably having two driven members which are interconnected together by a second drive belt, the second drive belt engaging a pulley mounted for (controlled) rotary movement. Alternatively the actuator can be a linear actuator, preferably having a carriage mounted for linear movement.

Certain embodiments of linear and rotary actuators also include one or more guide pulleys which are also engaged by the endless drive belt and serve to guide and/or redirect the drive belt between the drive and driven pulleys. Alternatively, the first drive pulley and the second drive pulley are interconnected to rotate in opposite directions, which can avoid the requirement for guide pulleys.

A control line can be connected to the driven member, movement of the driven member causing corresponding movement of the control line. The control line can be connected to a robotic arm, for example.

The motor may be an electric motor. In a particular embodiment of the present invention, the electric motor may drive the drive pulleys via a worm and wheel assembly thus providing additional mechanical advantage. In these embodiments, it is sometimes preferred that the worm and wheel have a pitch selected to prevent back drive. This has the advantage that no braking mechanism is necessary.

It can be arranged that the drive belt is always flexed in one direction around the various pulleys, i.e. preferably towards the teeth in embodiments of belt having teeth. Alternatively, the drive belt can be flexed in both directions, i.e. both towards the teeth and away from the teeth as it passes around the various pulleys, so that the belt teeth face outwards as they pass around some of the pulleys. The flexing of the belt in both directions is described herein as contraflexure drive, and contraflexure drive can be used with both linear and rotary actuators.

In all embodiments of the invention where a drive belt is specifically used (i.e. as opposed to a chain or cable for example) the path of the drive belt between the drive pulleys, the driven pulleys and the guide pulleys (if present) respectively, is orientated by means of an angled pulley. The size and angle of the pulley is to chosen so that the central axis of the drive belt fibres is substantially co-axial between the respective pulleys. This means that the drive belt is twisted along this axis with little or no translation or lateral movement, thus minimising stress variation across the belt fibres.

Linear actuators in accordance with the present invention have been found to be particularly useful in the control of robotic arms of the type described in international application no. WO2002/016995, the disclosure of which is incorporated herein by reference.

Figure 10:
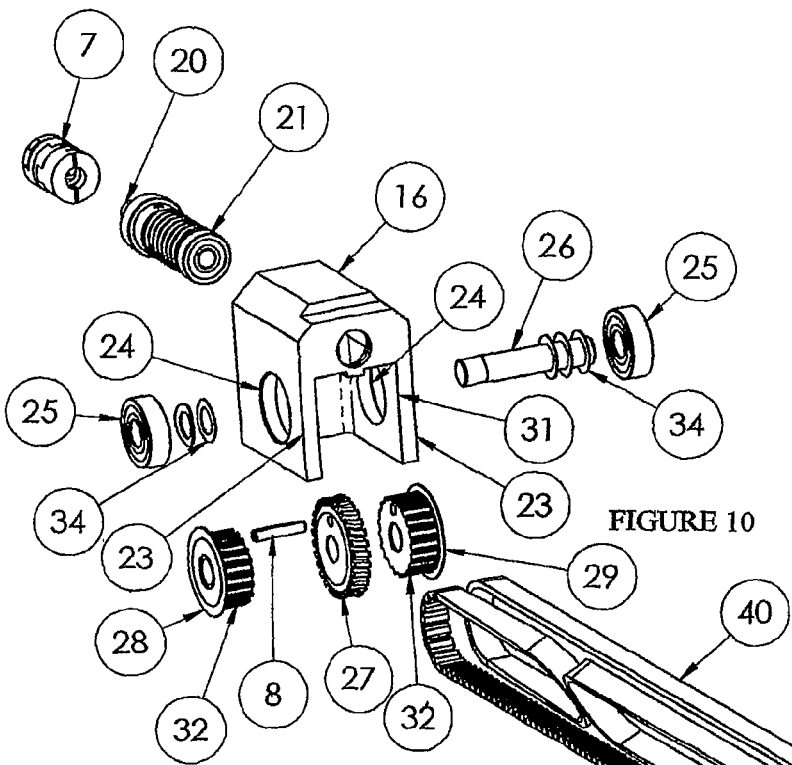
Figure 11:
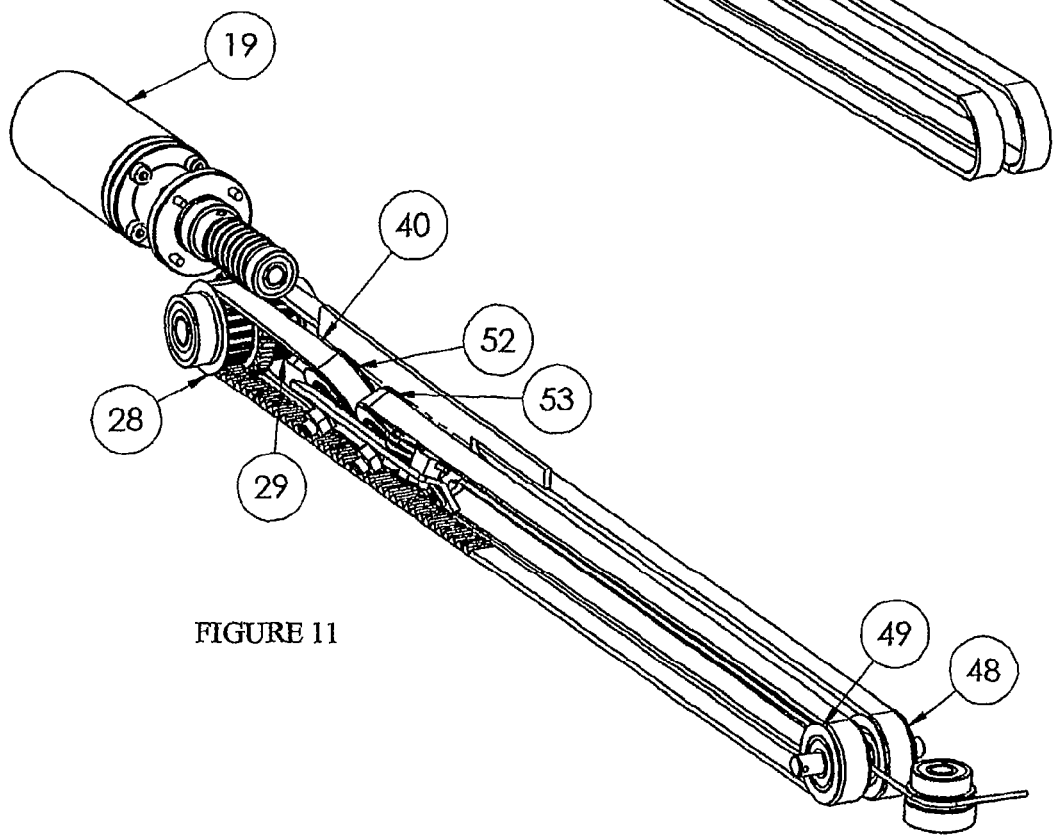
Figure 19:
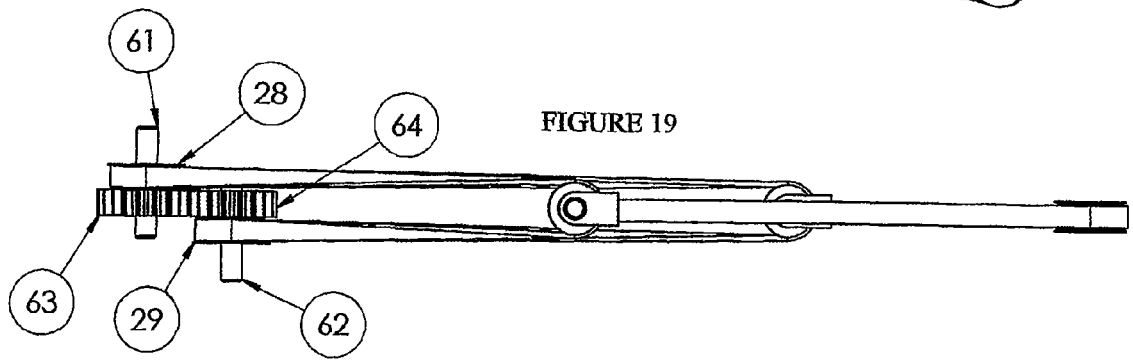
Figure 20:
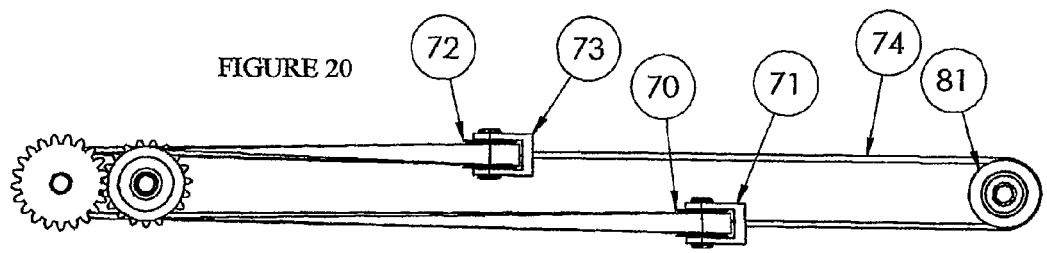
Figure 21:
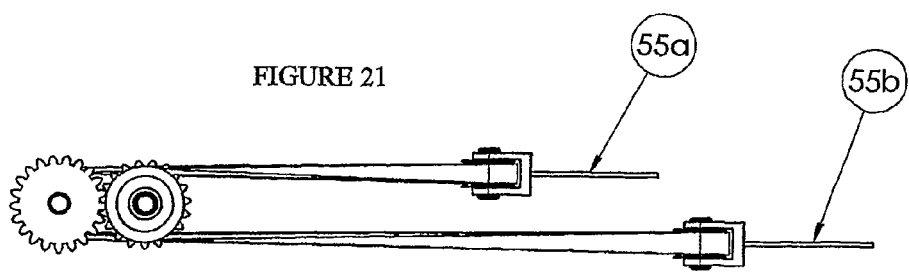

There follows a description of several exemplary embodiments of actuator in accordance with the present invention, with reference to the accompanying drawings, in which:

FIG. 1 is a perspective view of a first embodiment of linear actuator in accordance with the present invention, FIG. 2 is a schematic representation, in end view, showing how the driven pulleys are positioned with respect to the drive pulleys, FIG. 3 is a top view of the actuator of FIG. 1, FIG. 4 is a cut-away side view of the actuator of FIG. 1, FIG. 5 is a sectional view on the line B-B of FIG. 3, FIG. 6 is a part section on the line E-E of the carriage of FIG. 3, FIG. 7 is a part section on the line C-C of FIG. 4, FIG. 8 is a section through the drive pulleys on the line A-A of FIG. 4, FIG. 9 is a detailed view of the area labelled D in FIG. 4, FIG. 10 is an exploded view of the drive assembly of the actuator of FIG. 1, FIG. 11 is a perspective view of the actuator of FIG. 1 with the housing removed, FIG. 12 is a perspective view of a second embodiment of linear actuator according to the invention, with part of the carriage removed, FIG. 13 is a perspective view of the drive belt configuration in the actuator of FIG. 12, FIG. 14 is a sectional view along line G-G of the FIG. 15, FIG. 15 is a top view of the actuator of FIG. 12, with the carriage complete, FIG. 16 is a side view of the actuator of FIG. 15, FIG. 17 is a sectional view along line F-F of FIG. 15, FIGS. 18-20 are diagrammatic views of a first embodiment of a linear and/or rotary actuator in accordance with the present invention, FIG. 21 is a variant of the embodiment of FIGS. 18-20, FIG. 22 is a perspective view of an embodiment of rotary actuator according to the invention, FIG. 23 is a sectional view along the line H-H of FIG. 25, FIG. 24 is a perspective view of the drive belt configuration in the embodiment of FIG. 22, FIG. 25 is a top view of the actuator of FIG. 22, and FIG. 26 is a sectional view along the lines L-L of FIG. 25.

In the following description the same reference numerals are used for similar is components in the various embodiments.

Referring first to FIG. 1, the actuator illustrated generally at 10 comprises a longitudinal, channel shaped housing 11 having, at a first end 12, a motor and control assembly indicated generally at 14, and having at a second end 13, a control wire guide 15 (see FIG. 7)

The motor and control assembly 14 comprises a worm block 16 the base 17 of which is secured to the base of the channel shaped housing 11 at first end 12. The rear face 9 of worm block 16 carries an electric motor 19, which through coupling 7 (FIG. 5) turns the drive shaft 20 which projects through said rear face 9 and terminates in a drive worm 21 (see FIGS. 5 and 10). The front face of the worm block 16 is cut away to provide a front opening 31 (FIG. 10).

The sidewalls 23 of worm block 16 each carry a circular opening to provide a transverse bore 24, each of said openings accommodating a respective bearing 25. Each bearing 25 is adapted to receive for rotation therein an axle 26 having mounted thereon and for rotation therewith a worm wheel 27, a first drive pulley 28 and a second drive pulley 29. In this embodiment, the worm wheel 27, first drive pulley 28 and second drive pulley 29 are formed as a unit; it will be appreciated that the first drive pulley 28 and the second drive pulley 29 may be formed as independent components each of which may be keyed to worm wheel 27 for rotation therewith by means well-known in the art, or as shown in this embodiment be joined by pin 8. The worm wheel and pulleys assembly is provided with shims and washers 34 for appropriate location of the worm wheel 27 and its associated first and second drive pulleys 28 and 29 relative to the front opening 31.

Each of the first drive pulley 28 and the second drive pulley 29 are provided with respective teeth 32. In this embodiment the radius and therefore the circumferential length of the second drive pulley 29 is greater than that of the first drive pulley 29, so that the second drive pulley 29 is provided with one more tooth than the first drive pulley 28 (in other embodiments the drive pulleys can differ in circumferential length by more than one tooth). Each of the drive pulleys 28 and 29 is adapted to receive a wrap of an endless drive belt 40.

Drive belt 40 is an endless or continuous belt which in this embodiment is of generally rectangular shaped cross-section having teeth on the inner surface thereof. Each of said teeth is adapted to engage corresponding teeth 32 on pulleys 28 and 29 respectively.

The fixings for worm block 16 also secure a rearward extension 35 to housing 11 which extension 35 carries a printed circuit board 36 through which electric motor 19 is controlled.

The second end 13 of housing 11 also carries a pulley assembly indicated generally at 45 (see FIG. 3). The pulley assembly 45 is associated with control wire guide indicated generally at 15 (FIG. 7). The assembly 45 is supported by slots 46 (FIG. 1) in housing 11 which slots carry a transverse axle 47 (FIGS. 1 and 7) which in turn carries, for rotation thereon, guide pulleys 48 and 49 respectively. Each of guide pulleys 48 and 49 is adapted to accept a wrap of belt 40 and each of guide pulleys 48 and 49 is independently rotatable on transverse axle 47. The position of the axle 47 is maintained in slots 46 by the tension in drive belt 40. The drive belt tension is set during assembly by virtue of ramps 6 acting on bearings 25 in housing 11 (see FIG. 4). In an alternative embodiment, a support piece for axle 47 may be releasably secured to the housing and means provided for biasing the support piece away from the motor and control assembly 14 for the purpose of tensioning the drive belt 40.

Driven member or carriage 50 comprises a longitudinal member at 51 having a pair of longitudinally spaced driven pulleys 52 and 53 mounted for rotation with respect thereto. A forward extension 54 of longitudinal member 51 carries connecting means of generally known type for connecting a control wire 55 to the carriage by wrapping control wire 55 around helix 59 and securing with clamp 60 (see FIG. 9). In this particular embodiment, control wire 55 extends from the carriage 50 through guide hole 56 provided in the cylindrical surface of axle 47 and about an idler wheel 57 to exit the housing 11 by means of opening 58. The arrangement is such that movement of carriage 50 generally along the longitudinal axis of housing 11 results in corresponding movement of control wire 55.

The drive belt 40 is configured generally as shown in FIGS. 10 and 11. The drive belt passes from the first drive pulley 28 to the first driven pulley 52, from the first driven pulley 52 to the second drive pulley 29, from the second drive pulley 29 to the first guide pulley 48, from the first guide pulley 48 to the second driven pulley 53, from the second driven pulley 53 to the second guide pulley 49, and from the second guide pulley 49 back to the first drive pulley 28. The drive belt 40 defines a first loop between the first driven pulley 52 and the drive pulleys 28,29, and a second loop between the second driven pulley 53 and the guide pulleys 48,49, rotation of the drive pulleys 28,29 in a first direction causing an increase in the length of the first loop and a corresponding decrease in the length of the second loop.

As is more clearly seen in FIG. 2, the axis of rotation of the first driven pulley 52 is angled with respect to the (common) axis of rotation of the drive pulleys 28 and 29. This allows the path of the drive belt 40 to be aligned with both of the drive pulley 28 and the drive pulley 29 without requiring lateral movement or deformation of the belt.

As is also seen in FIG. 2, the driven pulley 52 is positioned and sized such that the central axis 90 of the drive belt 40, i.e. the central axis of the longitudinal fibres of the drive belt, at the point at which the drive belt joins and leaves the driven pulley 52, is precisely aligned with the central axis 90 of the drive belt 40 at the point at which the belt leaves or joins the drive pulleys 28 and 29 respectively. It will be understood that the belt 40 is caused to twist as it moves between a drive pulley 28,29 and the driven pulley 52, but that the twist is effected about the central axis 90 of the belt fibres. It is well recognised that a drive belt of this type is less likely to suffer damage or deterioration if it is twisted about its central axis, than would be the case if it was twisted about some other axis, and/or is required to move or deform laterally.

Clearly, it is not necessary that the driven pulley aligns the path of the drive belt precisely with the drive pulleys, nor that the central axis of the drive belt as it leaves or joins the driven pulley is precisely aligned with the central axis of the belt as it joins or leaves a drive pulley, but the greater the misalignment the greater the likelihood of damage and deterioration of the belt, so that substantial alignment is preferred and precise alignment is ideal.

The relationship between the driven pulley 53 and the guide pulleys 48, 49 is the same as that shown in FIG. 2 so that the drive belt 40 only undergoes twisting movement, about its central axis, during its whole path of movement, regardless of the position of the carriage 50. Whilst this ideal relationship between the pulleys is specifically described for the embodiment of FIGS. 1-11, the relationship between the pulleys in the other embodiments shown in the Figures is similarly ideal, though in those embodiments also the pulleys could be substantially aligned rather than precisely aligned, if desired.

In embodiments using a chain, cable or the like instead of the drive belt 40, the substantial or precise alignment of the pulleys could be maintained, though the location of the axis about which the chain, cable or the like should ideally twist may depend upon the structure of that component.

It will be appreciated that by tensioning the drive belt 40, the carriage 50 can be effectively suspended between the pulley assembly 45 and the motor and control assembly 14. This has the advantage of reducing the frictional forces within the actuator which would otherwise be occasioned by having the carriage travel along a track. In an alternative embodiment of the present invention, where tension in the continuous drive means cannot be maintained, or vibration of the belt needs to be controlled, track means may be provided for guiding and/or supporting the carriage.

Operation of the motor 19 causes rotation of the drive worm gear 21. Drive worm gear 21 engages worm wheel 27 and transmits rotation to each of drive pulleys 28 and 29. Since drive pulley 29 is provided with one more tooth then drive pulley 28, rotation of each pulley by one complete revolution will ensure that the part of the drive belt 40 which is wrapped around pulley 29 will advance further than the part of the drive belt 40 which is wrapped around pulley 28, by the pitch of one tooth. This will result in an increase in the length of the first loop of the belt (between the drive pulleys and the driven pulley 52) by the pitch of the teeth and a corresponding increase in the distance between the drive pulleys 28,29 and the carriage 50 by half the pitch of the teeth. Correspondingly; the feed of the drive belt 40 from guide pulley 48 will advance more quickly due to the take-up of drive pulley 29, with a result that there will be a corresponding reduction in the length of the second loop (between guide pulleys 48,49 and the driven pulley 53), and as a result the carriage 50 will be drawn towards the second end 13 of the housing 11, thus effectively extending the length of the control wire 55 outside the housing 11.

Reversing the direction of operation of the motor 19 reverses the effect on the size of the two loops described above with a result that the carriage will then move along the housing towards the motor 19 at the same time applying tension to and/or withdrawing control wire 55 into the housing.

In a conventional belt drive actuator utilising, for example, a belt having teeth with a pitch of five mm and a 20-tooth driving pulley, in order to achieve a 250 mm per second linear carriage speed would require a rotational rate of 150 rpm at the driving pulley. To achieve this rotational rate with a motor operating at a typical 6000 rpm would require a 40:1 gearbox. If the gearbox has one degree of backlash, this results in linear lost motion by linear backlash of 0.28 mm. In addition, any gaps between the pulley teeth and the drive belt will also become apparent as linear backlash on drive reversal.

In the embodiment of the invention described above, if the first drive pulley 28 has nineteen teeth and the second drive pulley 29 has twenty teeth, the teeth having a pitch of 5 mm, the linear displacement of the carriage 50 per revolution of the common axle 26 will be 2.5 mm. As the required linear speed is 250 mm per second, this may be achieved by a direct drive on the axle 26 from the motor at 100 revolutions per second or 6000 rpm (i.e. without requiring the reduction provided by the worm gear 21).

It will be appreciated that due to the topology of the drive belt 40 and driven pulleys 52,53, tension will be maintained for all positions of the carriage 50, and given the quality of commercially available drive belts and pulleys, an actuator according to the present invention can be economically produced that is substantially backlash free.

In the alternative contraflexure drive embodiment shown in FIG. 12, the drive pulleys 28,29 (having a tooth difference of one) are fixed to rotate with input drive shaft 26. These pulleys 28,29 and drive shaft 26 are mounted to a carriage 88 together with driven pulleys 52,53,84 and 85, all of which are free to rotate on respective bearings. Drive belt 40 passes from the first drive pulley 28 to the first driven pulley 52, from the first driven pulley 52 to the first guide pulley 48, from the first guide pulley 48 to the third driven, pulley 84, from the third driven pulley to the second drive pulley 29, from the second drive pulley to the fourth driven pulley 85, from the fourth driven pulley 85 to the second guide pulley 49, from the second guide pulley 49 to the second driven pulley 53, and from the second driven pulley 53 back to the first drive pulley 28.

Carriage 88 is supported by bearing blocks 87 which are mounted to track 86 to allow linear motion along the track. The drive belt configuration is shown in FIG. 13, with the drive belt 40 defining a first loop between the first guide pulley 48 and the first and third driven pulleys 52,84, and a second loop between the second guide pulley 49 and the second and fourth driven pulleys 53,85. Rotation of the drive shaft 26 and pulleys 28,29 in a first direction causes an increase in the length of the first loop and a corresponding decrease in the length of the second loop, causing motion of the carriage 88 along the track 86. Reverse rotation of drive shaft 26 reverses the direction of travel.

This embodiment has an advantage over the first embodiment of linear actuator in that it has a longer travel for a given length of drive belt, and is consequently stiffer.

This embodiment requires the drive motor (not shown) to be mounted to the carriage 88 which is also an advantage in certain applications.

The embodiment of FIGS. 12-17 also clarifies that the invention is suitable for use in a linear actuator where forces on the carriage 88 can be in either direction, and the position of the carriage can be controlled substantially backlash free.

Figure 18:
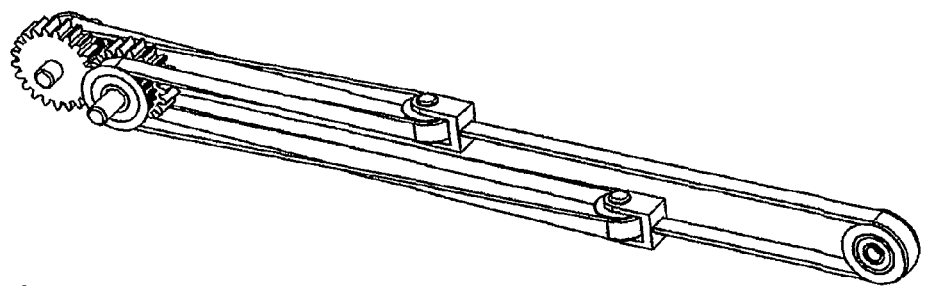

In the alternative embodiment shown in FIGS. 18-20, the drive pulleys 28 and 29 are each separately rotatable on axles 61 and 62 respectively and have the same number of teeth (although in other embodiments they could differ by one or more teeth). Each of axles 61 and 62 carry gear wheels 63 and 64 respectively, the arrangement being such that the number of teeth on each of gear wheels 63 and 64 is different by one tooth (although in other embodiments they could have the same number of teeth, or differ by more than one tooth). The gears are enmeshed one with the other so that rotation of axle 61 is transmitted to axle 62 in the opposite sense. This also allows the drive belt 40 to pass around the drive pulleys and driven pulleys without any guide pulleys being required to reverse or redirect the path of the drive belt.

The drive belt 40 passes from the first drive pulley 28 to the first driven pulley 70, from the first driven pulley 70 to the second drive pulley 29, from the second drive pulley 29 to the second driven pulley 72, and from the second driven pulley 72 back to the first drive pulley 29. The drive belt 40 defines a first loop between the first driven pulley 70 and the drive pulleys 28,29, and a second loop between the second driven pulley 72 and the drive pulleys 28,29, rotation of the drive pulleys in a first direction causing an increase in the length of the first loop and a corresponding decrease in the length of the second loop.

Unlike in the earlier embodiments described, the circumference of the respective pulleys 28,29 (and consequently the number of teeth if these are toothed pulleys) is the same. However, because of the difference in the number of gear teeth of gears 63 and 64, there is a corresponding difference in the relative rotational speeds of pulleys 28 and 29 giving a different circumferential speed for the pulleys 29, 29 and therefore a similar result as in the earlier embodiments.

It should be noted that different circumferential speeds of the pulleys 28, 29, and therefore different linear speeds of the driven members or U-shaped elements 71,73, could be achieved for a given input speed of shaft 61 by varying the difference in the number of teeth of the gears 63 and 64, by varying the number of teeth on the pulleys 28 and 29, or both.

The displacement of the U-shaped element 73 for one revolution of shaft 61 is equal to $(t1/t2*T2/T1)/2$, where $t1$ and $t2$ are the number of teeth on gears 63 and 64 respectively and $T1$ and $T2$ are the number of teeth on pulleys 28 and 29.

The U-shaped elements 71,73 are interconnected by means of a secondary belt loop 74, which passes about pulley 81. The principle of operation for this embodiment is the same as described above, but in this case the driven members are the first and second U-shaped elements 71 and 73 respectively. A secondary advantage of this arrangement is that the two driven members can provide separate control means for two differing, but related, functions since each driven member 71,73 moves in the opposite sense on appropriate motion of the drive shaft 61. It should be noted that this embodiment can be used to produce precise rotary motion of the pulley 81 and the secondary belt loop 74.

For wire or cable driven robotic arms, where the control wires or cables are used to control bending of sections, a single actuator can be used for two opposing cables by removing the secondary belt loop 74 and associated pulley and using control wires in place of secondary belt loop 74 to provide the necessary tension in the assembly. FIG. 21 shows such an arrangement in which the secondary belt loop 74 is replaced by control wires 55*a*, 55*b*.

The arrangement of the drive and driven pulleys of FIGS. 18-21 can therefore be used in a rotary actuator (to provide controlled rotation of the pulley 81), or in a linear actuator (to provide controlled movement of the driven members 71,73 or elements connected to the control wires 55*a*,55*b*.

The embodiment illustrated in FIGS. 22-26 is a variant of that described in FIGS. 18-21, in which a central drive shaft 80 is adapted to drive first drive pulley 28 and second drive pulley 29 (with in this embodiment a tooth difference of one). Drive belt 40 passes from the first drive pulley 28 to the first guide pulley 48, from the first guide pulley 48 to the first driven pulley 70, from the first driven pulley 70 to the second drive pulley 29, from the second drive pulley 29 to the second driven pulley 72, from the second driven pulley 72 to the second guide pulley 49, and from the second guide pulley 49 back to the first drive pulley 28.

The drive belt 40 defines a first loop between the first driven pulley 70 and the second drive 29 and first guide pulleys 48, and a second loop between the second driven pulley 72 and the second drive pulley 29 and second guide pulleys 49, rotation of the drive pulleys 28,29 in a first direction causing an increase in the length of the first loop and a corresponding decrease in the length of the second loop.

Driven members or U-shaped elements 71,73 provide attachment to belt 74 by way of tensioning devices 82,83 to provide tension around pulley 81 so that controlled rotation of the pulley 81 can be achieved. This embodiment has the advantage of having minimal belt twist and a low profile.

The embodiments of FIGS. 18-20 and FIGS. 22-26 also clarify that the invention is suitable for use in a rotary actuator where torque on the pulley 81 can be in either direction, and the angular position of the pulley can be controlled substantially backlash free.

The actuators described above further offer the possibility of providing very considerable force on a control wire 55, or carriage 88, or considerable torque on pulley 81, using a motor of relatively small power. In the preferred embodiment, using a worm gear such as 21, the mechanical advantage of the drive worm 21 and worm wheel 27 is considerable. The mechanical advantage of the pulley arrangement in accordance with the present invention is to the effect that the carriage will move by half the pitch of one tooth on a complete revolution of worm wheel 27. The mechanical advantage here again is considerable.

It will be appreciated by the person skilled in the art that the mechanical advantage can be altered by changing the pitch of the teeth on the drive belt 40 and on the drive pulleys 28, 29 and/or in the alternative by simply changing the difference in the number of teeth on the drive pulleys. Further changes can be effected by providing an additional gearbox within the drive train between motor 19 and output shaft 20, but as indicated above this will add to the cost and is generally not preferred.

It will be understood that in some of the described embodiments the drive belt 40 flexes around the drive pulleys, driven pulleys and guide pulleys (if present) in the same direction, i.e. towards the teeth of the belt. Those skilled in the art will appreciate that this allows (in the applicable embodiments) a reduction in the size of the pulleys, as compared to embodiments having contraflexure drive.

The present applicant has found that actuators of the kind described above result in excellent control for segmented robotic arms of the type described, for example, in international patent application WO2002/016995 and WO2002/100608. These actuators permit the use of relatively low-power motors to exert considerable force on the control wires for such robotic arms and their relative compactness enables a cluster of actuators to be mounted in juxtaposition with the arm with little additional routing of the control wires 55.

The invention claimed is:

1. An actuator (10) comprising:
   a first drive pulley (28);
   a second drive pulley (29), the first drive pulley and the second drive pulley being interconnected to rotate together;
   a first driven pulley (52; 70);
   a second driven pulley (53; 72);
   a first guide pulley (48);
   a second guide pulley (49);
   an endless drive belt (40) engaging the first and second drive pulleys, the first and second driven pulleys and the first and second guide pulleys;
   a motor (19) connected to drive the first and second drive pulleys to rotate and drive the endless drive belt;
   a driven member (50; 88; 71, 73) carrying at least one of the driven pulleys; the first and second drive pulleys being arranged so that upon rotation thereof the circumferential speed of the first drive pulley is different from the circumferential speed of the second drive pulley, the endless drive belt being looped around the drive pulleys, the driven pulleys and the guide pulleys so that the difference between the circumferential speed of the first drive pulley and the circumferential speed of the second drive pulley causes movement of the driven member;
   wherein each of the drive pulleys, driven pulleys and guide pulleys having a respective axis of rotation, two of the pulleys being angled pulleys, the axis of rotation of the angled pulleys being angled relative to the axis of rotation of the other pulleys whereby the drive belt undergoes twisting movement on the path between the angled pulley and an adjacent pulley.

2. An actuator according to claim 1, wherein the first and second drive pulleys are arranged so that upon rotation thereof the circumferential speeds differ because of
   the first drive pulley having a different circumferential length than the second drive pulley.

3. An actuator according to claim 1, wherein the driven member is a carriage (50; 88) mounted for linear movement.

4. An actuator according to claim 3, wherein the first driven pulley and the second driven pulley are both mounted upon the carriage (50; 88).

5. An actuator according to claim 4, wherein the driven pulleys (52, 53) are located between the drive pulleys (28, 29) and the guide pulleys (48, 49).

6. An actuator according to claim 5 having a third driven pulley (84) and a fourth driven pulley (85), the drive pulleys (28, 29) and all four of the driven pulleys (52, 53, 84, 85) being mounted upon the driven member (88), wherein the endless drive belt passes from the first drive pulley (28) to the first driven pulley (52), from the first driven pulley to the first guide pulley (48), from the first guide pulley to the third driven pulley (84), from the third driven pulley to the second drive pulley (29), from the second drive pulley to the fourth driven pulley (85), from the fourth driven pulley to the second guide pulley (49), from the second guide pulley to the second driven pulley (53), and from the second driven pulley back to the first drive pulley, the endless drive belt defining a first loop between the first guide pulley and the first and third driven pulleys, and a second loop between the second guide pulley and the second and fourth driven pulleys, rotation of the drive pulleys in a first direction causing an increase in the length of the first loop and a corresponding decrease in the length of the second loop.

7. An actuator according to claim 1, wherein a control line (55; 55a, 55b) is connected to the driven member, movement of the driven member causing corresponding movement of the control line.

8. An actuator according to claim 1, wherein the guide pulleys are the angled pulleys, whereby the drive belt undergoes twisting movement on the path between the guide pulleys and the driven pulleys, but undergoes substantially no lateral movement.

\* \* \* \* \*